(12) United States Patent
Göser

(10) Patent No.: US 7,926,649 B2
(45) Date of Patent: Apr. 19, 2011

(54) FLAT BELT MADE OF ELASTOMERIC MATERIAL

(75) Inventor: Hubert Göser, Dannenberg (DE)

(73) Assignee: ContiTech Antriebssysteme GmbH, Hannover (DE)

( * ) Notice: Subject to any disclaimer, the term of this patent is extended or adjusted under 35 U.S.C. 154(b) by 1131 days.

(21) Appl. No.: 11/629,975

(22) PCT Filed: May 13, 2005

(86) PCT No.: PCT/EP2005/052210
§ 371 (c)(1),
(2), (4) Date: Dec. 19, 2006

(87) PCT Pub. No.: WO2006/000500
PCT Pub. Date: Jan. 5, 2006

(65) Prior Publication Data
US 2008/0051240 A1    Feb. 28, 2008

(30) Foreign Application Priority Data
Jun. 25, 2004 (DE) .................... 10 2004 030 722

(51) Int. Cl.
| B65G 15/34 | (2006.01) |
| F16G 5/00 | (2006.01) |
| F16G 1/28 | (2006.01) |
| F16G 5/20 | (2006.01) |
| F16G 1/00 | (2006.01) |
| B32B 3/10 | (2006.01) |
| B32B 3/00 | (2006.01) |
| B32B 7/02 | (2006.01) |
| B66B 11/04 | (2006.01) |
| B66B 11/08 | (2006.01) |

(52) U.S. Cl. ........ 198/847; 474/261; 474/238; 474/250; 428/139; 428/172; 428/217; 187/251; 187/254; 187/255

(58) Field of Classification Search .................. 474/139, 474/205, 238, 250, 261, 262, 266; 428/111, 428/114; 198/847
See application file for complete search history.

(56) References Cited

U.S. PATENT DOCUMENTS
979,200 A * 12/1910 Prosser ....................... 198/690.2
1,793,604 A * 2/1931 Gates ............................ 474/262
(Continued)

FOREIGN PATENT DOCUMENTS
DE     25 12 530     9/1976
(Continued)

Primary Examiner — Michael R Mansen
Assistant Examiner — Henry Liu
(74) Attorney, Agent, or Firm — Walter Ottesen

(57) ABSTRACT

A flat belt (2), which is made of elastomeric material (46*a*, 46*b*), is made up of a first partial belt (2*a*) and a second partial belt (2*b*). The first partial belt (2*a*) is reinforced with a reinforcement layer (4) made up of cords. A layer separation which is to be feared theoretically is to be reliably avoided and the bonding of the belt material to the reinforcement layer (4) is to be optimized. The first belt part (2*a*) is provided with slots (44) with the aid of mold drum winding-projections (42); the second belt part (2*b*) defines a filling of the slots (44) of the first belt part (2*a*). Preferably, the reinforcement layer (4) is positioned centrally in the neutral bending plane of the finished flat belt (2). The first belt part (2*a*) and the second belt part (2*b*) can be made of different elastomeric materials (46*a*, 46*b*). Also, at least one of the two surfaces of the belt (2) can be coated and/or provided with a longitudinal profile or transverse profile.

6 Claims, 2 Drawing Sheets

U.S. PATENT DOCUMENTS

| | | | | |
|---|---|---|---|---|
| 2,062,568 A * | 12/1936 | Freedlander | ................ | 474/265 |
| 2,310,819 A * | 2/1943 | Van Orden | ................ | 198/847 |
| 2,515,778 A * | 7/1950 | Knowland | ................ | 156/182 |
| 2,745,541 A * | 5/1956 | Hofstatter | ................ | 198/836.1 |
| 2,766,159 A * | 10/1956 | Adams, Jr. et al. | ................ | 198/847 |
| 2,793,150 A * | 5/1957 | Deaves | ................ | 198/847 |
| 2,850,420 A * | 9/1958 | Hacker | ................ | 428/111 |
| 2,983,636 A * | 5/1961 | Runton | ................ | 198/847 |
| 3,063,884 A * | 11/1962 | Glover et al. | ................ | 428/212 |
| 3,103,703 A | 9/1963 | Ludewig | | |
| 3,221,869 A * | 12/1965 | Paasche | ................ | 198/847 |
| 3,246,735 A * | 4/1966 | Davis et al. | ................ | 198/847 |
| 3,291,288 A * | 12/1966 | Haustovich | ................ | 198/699.1 |
| 3,335,843 A * | 8/1967 | Duvivier | ................ | 198/847 |
| 3,473,989 A * | 10/1969 | Richmond | ................ | 156/138 |
| 3,580,767 A * | 5/1971 | Barnes | ................ | 156/138 |
| 3,593,840 A * | 7/1971 | Guyer | ................ | 198/847 |
| 3,643,518 A * | 2/1972 | Semin et al. | ................ | 474/139 |
| 3,818,741 A * | 6/1974 | Terhune | ................ | 474/238 |
| 3,880,558 A | 4/1975 | Breher et al. | | |
| 3,900,627 A * | 8/1975 | Angioletti et al. | ................ | 428/114 |
| 3,944,060 A * | 3/1976 | Hartmann | ................ | 198/847 |
| 4,024,773 A * | 5/1977 | Hartman et al. | ................ | 474/263 |
| 4,027,545 A * | 6/1977 | White, Jr. | ................ | 474/252 |
| 4,109,543 A * | 8/1978 | Foti | ................ | 198/847 |
| 4,165,403 A * | 8/1979 | Alban | ................ | 428/140 |
| 4,184,589 A * | 1/1980 | Habegger | ................ | 198/847 |
| 4,188,832 A * | 2/1980 | Henderson | ................ | 474/250 |
| 4,268,471 A | 5/1981 | Breher | | |
| 4,305,714 A * | 12/1981 | Renshaw | ................ | 474/250 |
| 4,392,842 A * | 7/1983 | Skura et al. | ................ | 474/205 |
| 4,504,342 A * | 3/1985 | Marsh et al. | ................ | 156/138 |
| 4,583,963 A * | 4/1986 | Marsh et al. | ................ | 474/205 |
| 4,626,232 A * | 12/1986 | Witt | ................ | 474/205 |
| 4,632,665 A * | 12/1986 | Skura | ................ | 474/205 |
| 4,657,526 A * | 4/1987 | Tangorra et al. | ................ | 474/261 |
| 4,813,533 A * | 3/1989 | Long | ................ | 198/847 |
| 4,869,711 A * | 9/1989 | Komai | ................ | 474/263 |
| 4,931,118 A * | 6/1990 | Kitahama et al. | ................ | 156/138 |
| 5,004,098 A * | 4/1991 | Marshall | ................ | 198/847 |
| 5,041,063 A * | 8/1991 | Breher et al. | ................ | 474/205 |
| 5,119,927 A * | 6/1992 | Bruggemann | ................ | 198/847 |
| 5,164,241 A * | 11/1992 | Andre De La Porte et al. | ................ | 428/97 |
| 5,306,213 A * | 4/1994 | Nakajima et al. | ................ | 474/205 |
| 5,362,281 A * | 11/1994 | Dutton et al. | ................ | 474/205 |
| 5,422,165 A * | 6/1995 | Arnold | ................ | 428/192 |
| 5,427,728 A * | 6/1995 | Beck et al. | ................ | 264/229 |
| 5,614,267 A * | 3/1997 | Howlett | ................ | 427/447 |
| 5,658,655 A * | 8/1997 | Stanhope | ................ | 442/364 |
| 5,779,028 A * | 7/1998 | De Vries | ................ | 198/847 |
| 5,938,007 A * | 8/1999 | Fujihiro et al. | ................ | 198/847 |
| 6,117,035 A * | 9/2000 | Isshiki et al. | ................ | 474/205 |
| 6,508,354 B2 * | 1/2003 | Breed et al. | ................ | 198/847 |
| 6,540,069 B2 * | 4/2003 | Tschantz | ................ | 198/844.1 |
| 6,558,282 B2 * | 5/2003 | Danhauer et al. | ................ | 474/266 |
| 6,561,344 B1 * | 5/2003 | Basse | ................ | 198/844.1 |
| 6,666,326 B2 * | 12/2003 | Hymes et al. | ................ | 198/846 |
| 6,966,763 B2 | 11/2005 | Göser et al. | | |
| 7,413,633 B2 * | 8/2008 | Li et al. | ................ | 162/358.4 |
| 7,464,809 B2 * | 12/2008 | Nozaki et al. | ................ | 198/847 |
| 2003/0017900 A1 | 1/2003 | Kopang | | |
| 2006/0174997 A1 * | 8/2006 | Gibson et al. | ................ | 156/139 |
| 2006/0175137 A1 | 8/2006 | Alves et al. | | |
| 2007/0281814 A1 * | 12/2007 | Baldovino et al. | ................ | 474/205 |

FOREIGN PATENT DOCUMENTS

| | | |
|---|---|---|
| DE | 33 28 474 | 2/1985 |
| EP | 1 353 087 | 10/2003 |

\* cited by examiner

FLAT BELT MADE OF ELASTOMERIC MATERIAL

RELATED APPLICATION

This application is the national stage of PCT/EP 2005/052210, filed May 13, 2005, designating the United States and claiming priority from German patent application no. 10 2004 030 722.9, filed Jun. 25, 2004, the entire contents of which are incorporated herein by reference.

FIELD OF THE INVENTION

The invention relates to a flat belt, a method for manufacturing such a flat belt and an arrangement for carrying out the method of manufacturing the belt.

BACKGROUND OF THE INVENTION

The flat belts of this kind comprise an elastomeric material wherein tension carriers in the form of steel cords or plastic cords are integrated. In the manufacture of flat belts of this kind, one strives to position the cords in a single plane which is the bending-neutral plane.

(1) For positioning the cords exactly, the so-called winding-projection method has proven to be especially suitable. For this purpose, the mold drum used for manufacture is provided with (transverse) ribs, so-called projections. The upper edge of these ribs determines the plane of the cords. The ribs (projections) generate slots in the belt surface congruent thereto. The winding-projections technology is, for example, known from the manufacture of toothed belts (see, for example, U.S. Pat. Nos. 3,880,558 and 4,268,471).

In the area of elevator technology too, an exact positioning of the tension carriers results (see, for example, DE 25 12 530 A1) which are produced with the aid of winding-projection mold drums.

With the use of winding-projection mold drums for flat belts in elevator technology, other disadvantages have, however, crept in: these are the noise development given by the slot frequency and the increased bending load in the region of the slots.

(2) Flat belts with a noise-reduced groove arrangement are suggested for reducing the load given by the slot frequency. The grooves (slots), which are described in the European patent Publication EP 1,353,087 and United States patent application publication US 2006/0175137, are not at right angles but are preferably aligned to be inclined. They can be in straight lines, bent or be configured to have a V-shape or a zigzag-shape. Furthermore, the grooves can be spaced differently one from the other.

Flat belts, which are to be built into elevator systems, are redirected in both directions while running over various sheaves. For this reason, the plane of the reinforcement carriers should be arranged centrally in the belt. However, even when the tension carriers described are arranged centrally within the belt, a different bending characteristic results already on both sides because of the slots and this bending characteristic comes with an increased bending load in the region of these slots.

(3) To eliminate this unwanted condition, U.S. Pat. No. 6,966,763 suggests a two-stage method for manufacturing flat belts provided with reinforcement carriers. In these belts, there is likewise a planar positioning of the tension carriers parallel to the running surface. Because no slots are present here which are generated by winding projections, a longer service life can be anticipated because of the more uniform tension distribution.

Furthermore, this elevator belt is characterized by a very high cord density. In the semi-product, approximately half of the tension carrier cross section is exposed. The PU (polyurethane elastomer) surface on this belt side is therefore relatively small. To this side, however, the second belt half must be bonded in the second process step. The PU of the second belt half must then be welded to the PU of the first belt half.

The disadvantage of this belt, which is produced in the two-stage method, is given by the relatively small PU surface at the belt side which is to be welded. This disadvantage lies in a theoretical layer separation. The belt half, which is applied in the second step would again separate, and the tension carriers could come into direct contact with the drive discs. Furthermore, this method has the disadvantage that the bonding of the belt material to the tension carriers is not optimal.

SUMMARY OF THE INVENTION

The task of the invention is to improve the belt, which is produced in accordance with U.S. Pat. No. 6,966,763, and the method of making the same so that a layer separation which is to be feared theoretically is reliably avoided and the bonding of the belt material to the tension carriers is optimized.

The first belt part is provided with slots which are filled by the plasticatable material of the second belt part. In this way, there results a reliable meshing of the two belt parts with each other and a good bond between tension carrier and elastomeric material. In the suggested new solution, the semi-product has a maximum PU-weld on surface. Furthermore, a mechanical bonding is provided because of the filled winding projections which acts against shear forces.

For an exact planar positioning of the tension carriers, which are to be integrated into the first belt part, the mold drum has so-called winding projections on its periphery which are formed differently and can be arranged differently to each other. These winding projections arranged on the drum wheel peripheral surface are so dimensioned that the tension carrier layers are positioned centrally in the finished flat belt. In this way, an equal direction-changing characteristic of the belt is ensured on both sides, that is, a good positioning of the tension carrier and a good distribution of the bending stress.

In contrast to the method described in European patent publication EP 1,353,087, the slots disposed in the belt surface are filled in a further method step so that finally a slot free belt surface results. Additionally, with the complete surrounding flow of the filaments in the first process step, a better penetration of the PU into the filaments and therefore a better bonding is obtained.

For specific applications, it can be desirable to make the two belt parts from different elastomeric materials. This is possible without difficulty because of the two-stage manufacturing process.

Without a great additional complexity, it is also possible to provide one or two surfaces with a profile and/or a coating. With the method tied to forms, the surface structure can be easily influenced. Especially the second layer can be configured with longitudinal profiles or transverse profiles.

In addition to the elevator technology, the belt according to the invention can also be used for other flat belt arrangements.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
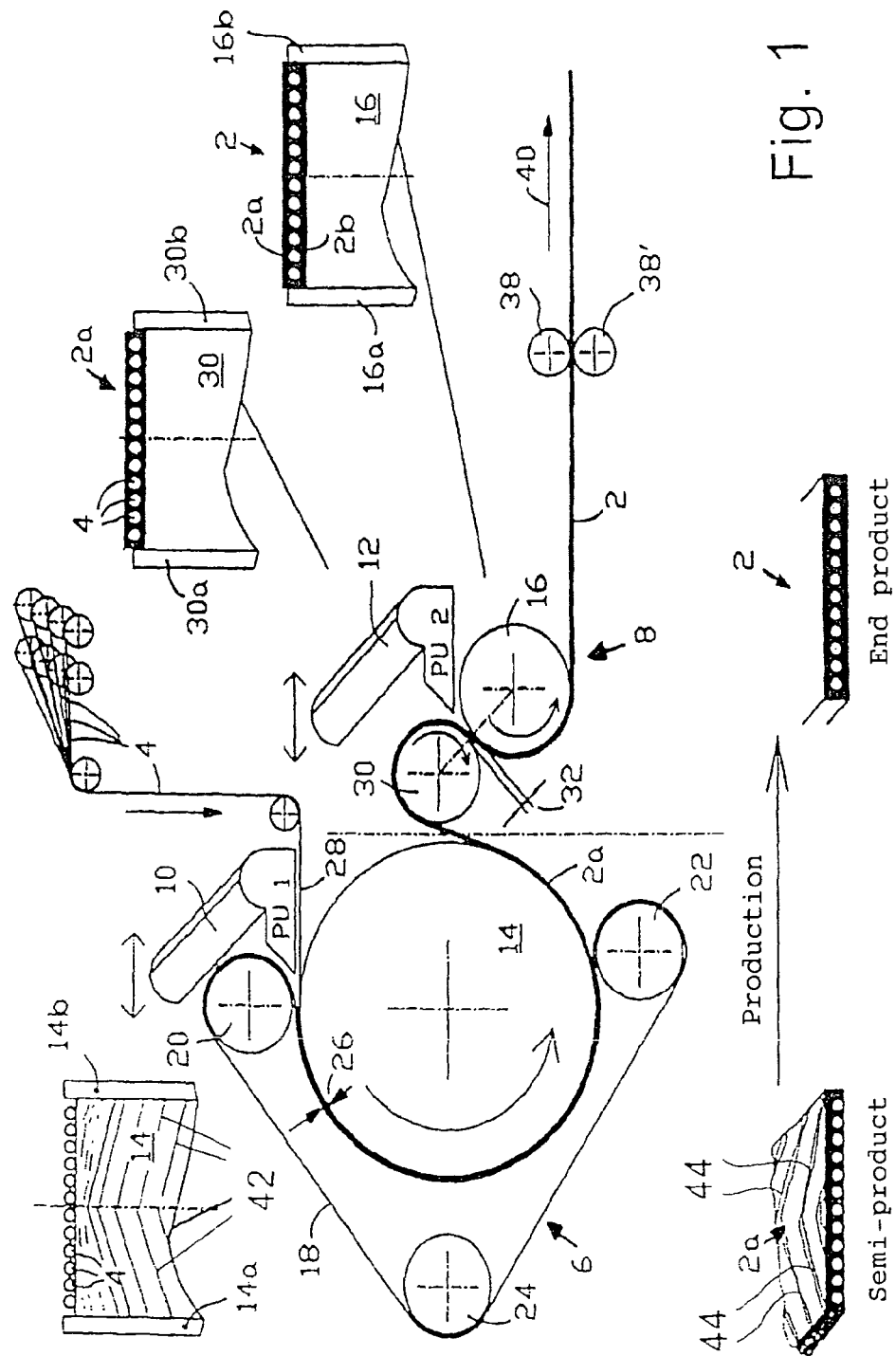
FIG. 1 shows the principal configuration of an arrangement.

The arrangement shown in FIG. 1 for making a belt 2 reinforced with reinforcement carriers 4 has two stations: a first station 6 and a second station 8. The first station 6 functions to make a first belt part 2a and comprises a mold drum 14, which is rotatable in the counterclockwise direction, and a continuous mold belt 18 which slings around a part of the mold drum 14. The ends of the part are defined by an upper pressure roller 20 and a lower pressure roller 22 in combination with a tensioning roller 24. A hollow mold space 26 is formed between the segment of the mold belt 18 and the peripheral surface of the mold drum 14 disposed therebelow. With the aid of the tensioning roller 24, the contact pressure of the mold belt 18 on the mold drum 14 can be adjusted.

Furthermore, the first station 6 includes an extruder 10 and a filament feed 28.

To manufacture the first belt part 2a on the first station 6, a plasticatable synthetic material (for example, PU) is outputted from the extruder 10 onto the temperature-controlled mold drum 14. At the same time, the reinforcement insert, which is provided as reinforcement carrier 4, is supplied via the filament feed 28. Because of the filament tension, the filaments 4 are pressed onto the peripheral surface of the mold drum 14 where they define the lower side of the first belt part 2a formed between the mold drum 14 and the mold belt 18.

A second station 8 directly follows the first station 6. This second station 8 essentially comprises a direction-changing roller 30 and a temperature-controlled mold drum 16. Like the first station 6, the second station 8 has an extruder 12.

For making a second belt part 2b or, more specifically, for making a finished belt 2 comprising the first belt part 2a and the second belt part 2b, the first belt part 2a is slung about the direction-changing roller 30 directly after leaving the mold drum 14 and is then slung about the mold drum 16. With the aid of the extruder 12, a plasticated synthetic material is applied to the side of the first belt part 2a provided with the reinforcement carrier 4 and is transported into the intermediate space formed between the first belt part 2a and the mold drum 16 (spacing 32 between the direction-changing roller 30 and the second mold drum 16). Here, the second belt part 2b is formed and is immediately joined or bonded to the first belt part 2a. Compared to the first station 6, the reinforcement layer 4 of the first belt part 2a assumes the function of a mold belt in that the belt 2, which leaves the mold drum 16, is guided over two rollers (38, 38') and is subjected to a pregiven tension 40 (pull-off device not shown). (The roller 30 is strictly a direction-changing roller.)

The first mold drum 14 has flange discs (14a, 14b) to limit and guide the first belt part 2a.

The second mold drum 16 is likewise provided with flange discs (16a, 16b) to limit and guide the finished product 2 formed by joining the first and second belt parts (2a, 2b) to each other.

The flange discs (30a, 30b) shown on the direction-changing roller 30 can be provided as a supplement but are not necessary.

In contrast to the arrangement shown in U.S. Pat. No. 6,966,763 and the belt manufacturing method which is to be carried out thereby, the mold drum surface of the first arrangement part (first station 6) is not smooth but instead has so-called winding projections 42 (see the detail view in the upper left portion of FIG. 1). In the present embodiment, these winding projections 42 are configured in the shape of an arrow. They can, however, have the shape of a straight line, a zigzag shape or a wave shape. With the aid of these winding projections 42 arranged on the mold drum peripheral surface, there results a pregiven spacing of the reinforcement layer 4 from the surface of the first belt part 2a. Furthermore, the mold drum winding projections 42 define the "mold" for impressing the surface of the first belt part 2a in that the mold drum winding projections 42 form slots 44 in the surface of the first belt part 2a with the slots 44 being congruent to the winding projections 42 (see detail view of the lower left hand corner of FIG. 1).

Directly after the making of the semi-product 2a by means of the first station 6, a filling of the slots 44 takes place between the drums 30 and 16, so-to-speak on-line, with the aid of the second station 8. Plasticatable elastomeric material 46b (see FIG. 2) from the extruder 12 is used to fill the slots 44. This material 46b can be identical to the material 46a from the extruder 10 (equals material of the semi-product 2a). For special belt requirements (for example, different coefficients of friction, various inks, et cetera), the materials (46a, 46b) can also be different. In the selection of the material, it is in any event important that the two layers (the two belt parts 2a, 2b) can be welded together effectively.

Figure 2:
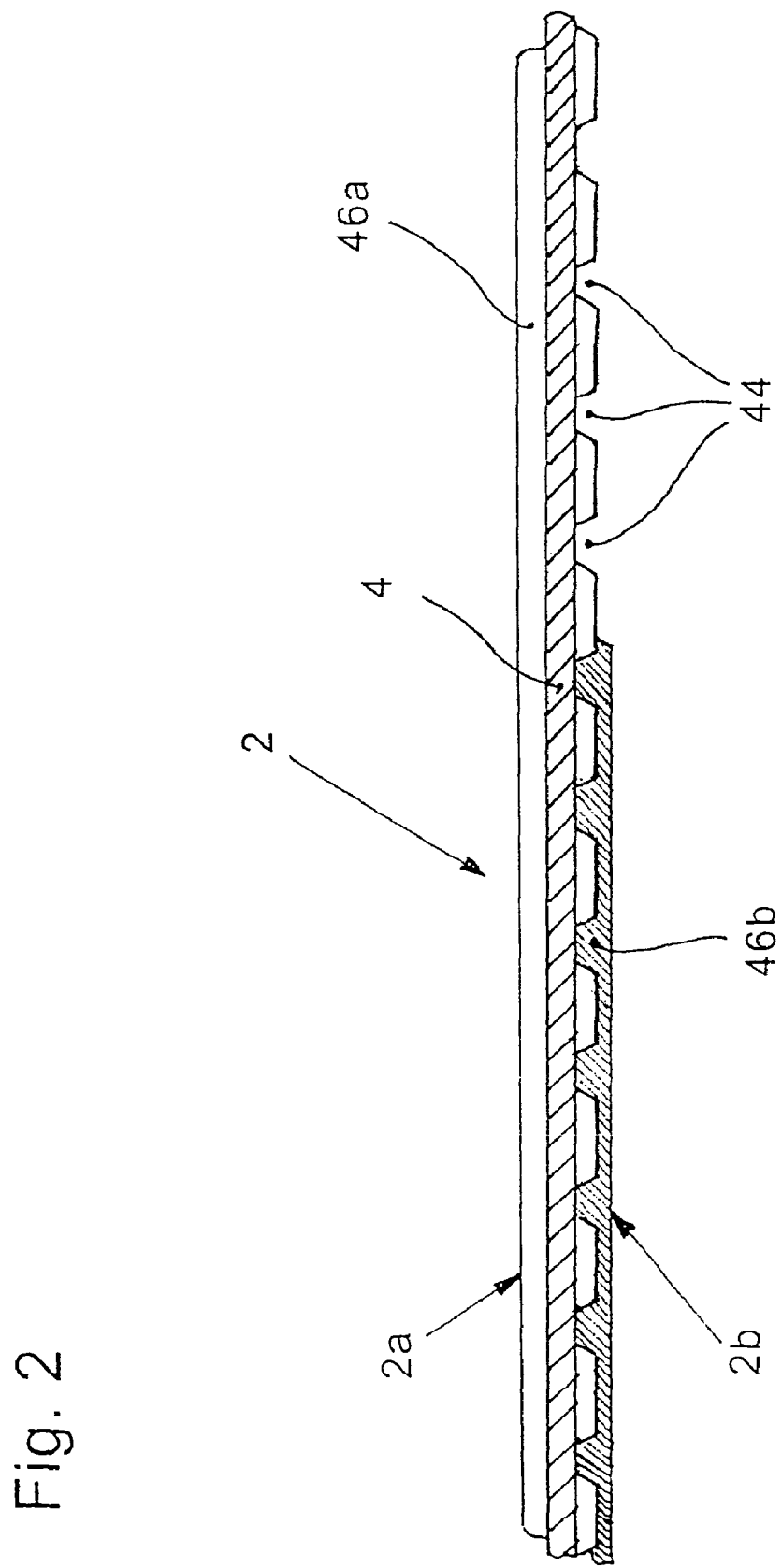
FIG. 2 shows a longitudinal section through a belt produced with the arrangement.

FIG. 2 shows the configuration of the flat belt 2 according to the invention produced with the aid of the arrangement shown in FIG. 1. This flat belt (the end product) 2 is made up of two belt parts (2a, 2b). The first belt part (semi-product) 2a is produced in the first station 6 and includes a reinforcement layer 4. The cords of this reinforcement layer 4 are positioned precisely in a common plane with the aid of winding projections 42 disposed on the mold drum peripheral surface. The slots 44 are generated by the mold drum winding projections 42 on the lower side of the first belt part 2a and are closed (filled up) with the aid of the second belt part 2b. Both belt parts (2a, 2b) conjointly form the complete end product, namely, flat belt 2.

REFERENCE NUMERAL LIST

2 Belt, flat belt, finished product, end product
2a first belt part, half product, semi-product
2b second belt part
4 Reinforcement carrier, reinforcement layer, tension carrier layer, filaments, cords
6 first station (station 1)
8 second station (station 2)
10 (first) extruder
12 (second) extruder
14 (first) mold drum
14a, 14b Means on the first mold drum for lateral guidance of a (part) belt, flange discs
16 (second) mold drum
16a, 16b Means on the second mold drum for lateral guidance of a belt, flange discs
18 continuous mold belt
20 upper pressure roller
22 lower pressure roller
24 Tension roller
26 Hollow mold space
28 Filament feed
30 Direction-changing roller
30a, 30b Means on the pressure roller for lateral guidance of a (part) belt, flange discs 32 Spacing between direction-changing roller 30 and second mold drum 16
38, 38' Roller
40 Tension
42 Winding projections
44 Slots
46a, 46b plasticatable, elastomeric material

The invention claimed is:

1. A flat belt made of elastomeric material, the flat belt comprising:
 a first elastomeric belt part defining a longitudinal axis and having a layer of tension carriers for reinforcing said first belt part;
 said tension carriers being embedded in said first belt part so as to be surrounded by the elastomeric material thereof;
 a second elastomeric belt part;
 said first elastomeric belt part having a surface facing toward said second belt part;
 said first elastomeric belt part having a plurality of slots formed therein at said surface having a length longer than a width thereof;
 said slots extending from said surface into said first elastomeric belt part to said tension carriers and the length of said slots extending in a lateral direction transversely to said longitudinal axis; and,
 said second elastomeric belt part being formed on said surface and filling out said slots past said first surface of said first elastomeric belt part thereby mechanically bonding said first and second elastomeric belt parts to each other.

2. The flat belt of claim 1, wherein said flat belt defines a neutral bending plane; and, said layer of tension carriers is disposed centrally in said neutral bending plane.

3. The flat belt of claim 1, wherein said first elastomeric belt part is made of a first elastomeric material and said second elastomeric belt part is made of a second elastomeric material different from said first elastomeric material.

4. The flat belt of claim 1, wherein said flat belt has first and second outside surfaces and both of said first and second outside surfaces are coated.

5. The flat belt of claim 1, wherein said flat belt has first and second outside surfaces and at least one of said outside surfaces has a longitudinal profile or a transverse profile.

6. The flat belt of claim 1, wherein said flat belt has first and second lateral edges and said slots extend from said first lateral edge to said second lateral edge.

* * * * *

UNITED STATES PATENT AND TRADEMARK OFFICE
CERTIFICATE OF CORRECTION

PATENT NO. : 7,926,649 B2  
APPLICATION NO. : 11/629975  
DATED : April 19, 2011  
INVENTOR(S) : Hubert Göser Page 1 of 1

It is certified that error appears in the above-identified patent and that said Letters Patent is hereby corrected as shown below:

On the Title Page:
Under (57) ABSTRACT, lines 2 and 3: delete all instances of "partial belt" and substitute -- belt part -- therefor.

In column 1:
Line 48: delete "Publication" and substitute -- publication -- therefor.

Signed and Sealed this
Seventh Day of June, 2011

David J. Kappos
*Director of the United States Patent and Trademark Office*